US011869496B2

(12) United States Patent
Hara et al.

(10) Patent No.: US 11,869,496 B2
(45) Date of Patent: Jan. 9, 2024

(54) INFORMATION PROCESSING DEVICE AND INFORMATION PROCESSING METHOD, AND INFORMATION PROCESSING SYSTEM

(71) Applicant: Sony Corporation, Tokyo (JP)

(72) Inventors: Masahiro Hara, Tokyo (JP); Shinpei Kameoka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 442 days.

(21) Appl. No.: 17/055,140

(22) PCT Filed: Apr. 11, 2019

(86) PCT No.: PCT/JP2019/015875
§ 371 (c)(1),
(2) Date: Nov. 13, 2020

(87) PCT Pub. No.: WO2019/225201
PCT Pub. Date: Nov. 28, 2019

(65) Prior Publication Data
US 2021/0217414 A1 Jul. 15, 2021

(30) Foreign Application Priority Data
May 25, 2018 (JP) ................................. 2018-100418

(51) Int. Cl.
*G10L 15/22* (2006.01)
*G10L 13/00* (2006.01)
*G10L 15/18* (2013.01)

(52) U.S. Cl.
CPC .............. *G10L 15/22* (2013.01); *G10L 13/00* (2013.01); *G10L 15/1815* (2013.01)

(58) Field of Classification Search
CPC ............................. G10L 15/22; G10L 15/223
See application file for complete search history.

(56) References Cited

U.S. PATENT DOCUMENTS 9,338,493 B2 * 5/2016 Van Os ................... G06F 3/167
10,049,663 B2 * 8/2018 Orr .......................... G10L 17/22
(Continued)

FOREIGN PATENT DOCUMENTS

CN 103631853 A 3/2014
CN 106462617 A 2/2017
(Continued)

OTHER PUBLICATIONS

International Search Report and Written Opinion dated Jun. 25, 2019 for PCT/JP2019/015875 filed on Apr. 11, 2019, 10 pages including English Translation of the International Search Report.

*Primary Examiner* — Abul K Azad
(74) *Attorney, Agent, or Firm* — XSENSUS LLP

(57) ABSTRACT

The present invention provides an information processing device that processes a voice-based agent interaction, and an information processing method, and provides an information processing system.
The information processing device is provided with: a communication unit that receives information related to an interaction with a user through an agent residing in a first apparatus; and a control unit that controls an external agent service. The control unit collects the information that includes at least one among an image or a voice of the user, information related to operation of the first apparatus by the user, and sensor information detected by a sensor with which the first apparatus is equipped. The control unit controls calling of the external agent service.

3 Claims, 10 Drawing Sheets

(56) References Cited

U.S. PATENT DOCUMENTS

| | | | |
|---|---|---|---|
| 10,714,081 B1 * | 7/2020 | Miller | G10L 15/08 |
| 2004/0044516 A1 | 3/2004 | Kennewick | |
| 2014/0108019 A1 * | 4/2014 | Ehsani | G10L 21/06 |
| | | | 704/275 |
| 2014/0129942 A1 | 5/2014 | Rathod | |
| 2015/0382047 A1 | 12/2015 | Van Os | |
| 2017/0358302 A1 | 12/2017 | Orr | |
| 2018/0108343 A1 | 4/2018 | Stevans | |

FOREIGN PATENT DOCUMENTS

| | | |
|---|---|---|
| JP | 2001-34616 A | 2/2001 |
| JP | 2002-82748 A | 3/2002 |
| JP | 2005-167628 A | 6/2005 |
| JP | 2007-143010 A | 6/2007 |
| JP | 2008-90545 A | 4/2008 |
| JP | 2016-100613 A | 5/2016 |
| JP | 2017-527844 A | 9/2017 |
| JP | 2018-55422 A | 4/2018 |
| WO | 2014/203495 A1 | 12/2014 |
| WO | 2015/064072 A1 | 5/2015 |

* cited by examiner

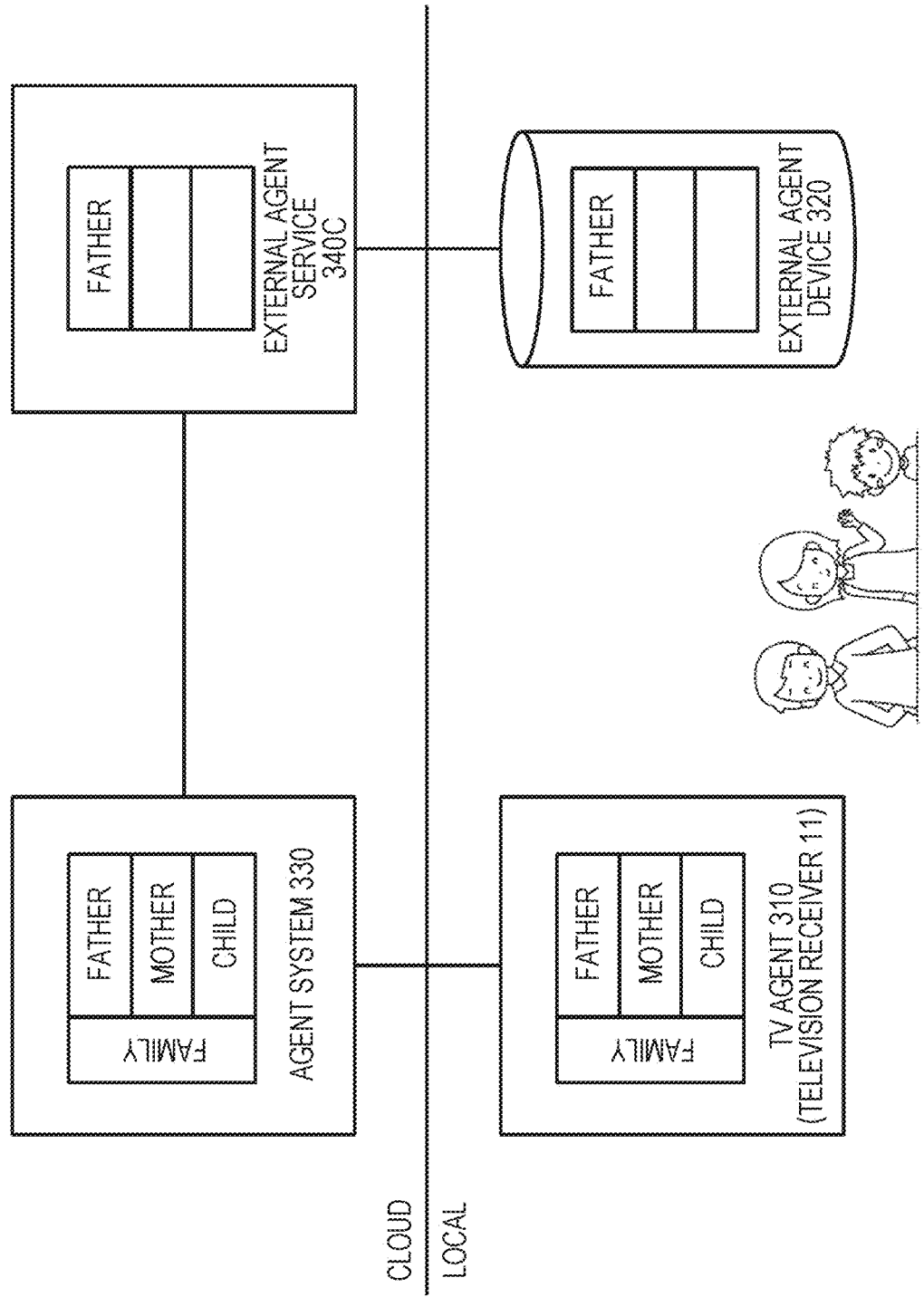

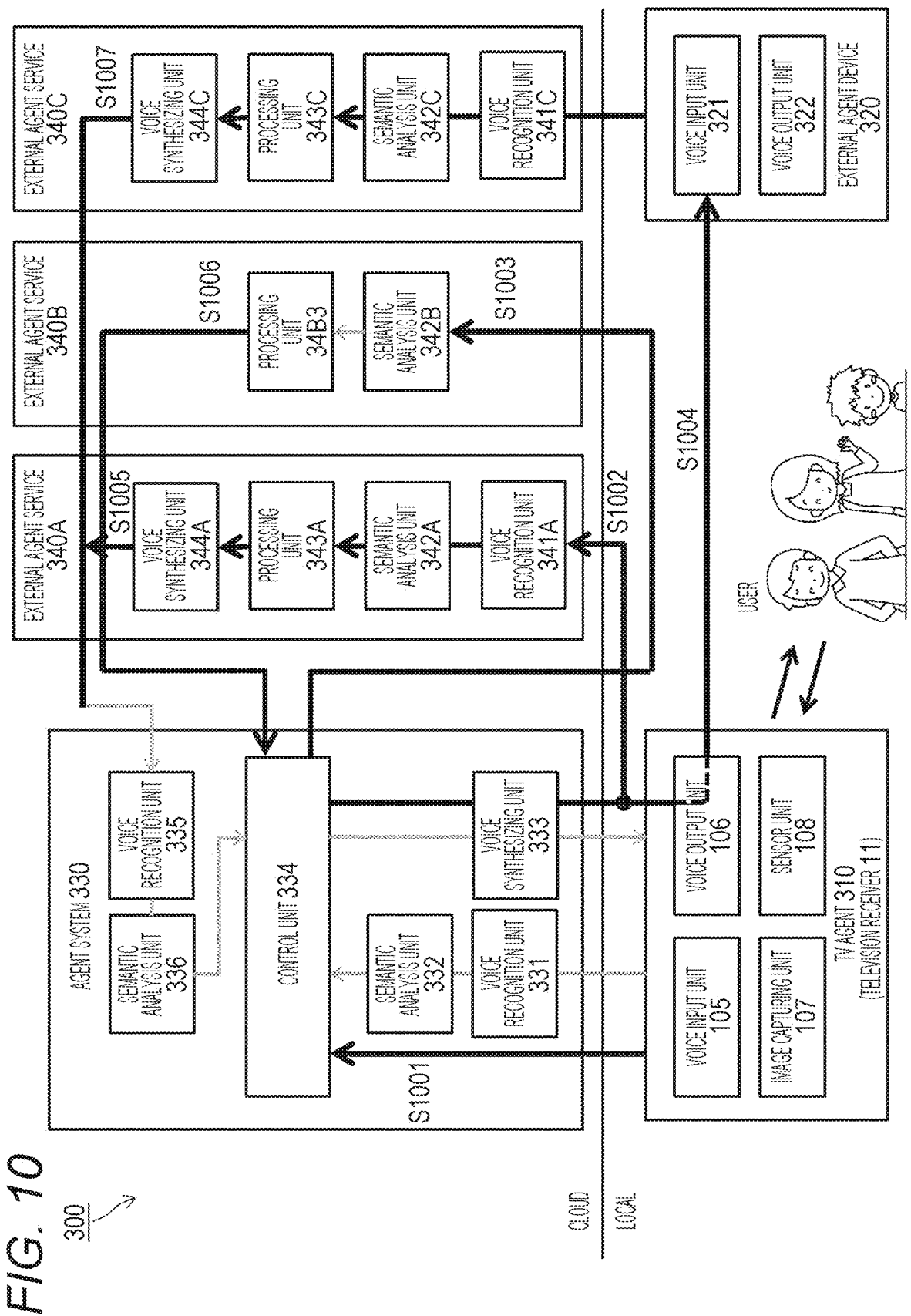

INFORMATION PROCESSING DEVICE AND INFORMATION PROCESSING METHOD, AND INFORMATION PROCESSING SYSTEM

CROSS-REFERENCE TO RELATED APPLICATIONS

The present application is based on PCT filing PCT/JP2019/015875, filed Apr. 11, 2019, which claims priority to JP 2018-100418, filed May 25, 2018, the entire contents of each are incorporated herein by reference.

TECHNICAL FIELD

The technology disclosed in the present description relates to an information processing device that processes a voice-based agent interaction, and an information processing method, and relates to an information processing system.

BACKGROUND ART

Recently, an agent that presents various kinds of information to a user in response to the use and a situation while interacting with the user by using a voice or the like begins to spread. For example, there is conventionally known an agent that not only carries out on/off and adjustment operation for home electric appliances such as a lighting device and an air conditioner, but also, for example, when an inquiry about a weather forecast, stock and exchange information, or news is received, responds to the inquiry by voice, receives an order of a commodity, and reads out contents of a purchased book.

In general, an agent function is provided by cooperation between an agent device installed around a user in a household or the like and an agent service constructed on a cloud (refer to, for example, Patent Document 1). For example, the agent device mainly provides a user interface including voice input that accepts a voice uttered by a user, and voice output that responds to an inquiry from the user. Meanwhile, on the agent service side, high-load processing is executed, the high-load processing including voice recognition and semantic analysis of a voice input into the agent device, processing such as information retrieval corresponding to a user's inquiry, voice synthesis based on a processing result, and the like.

In addition, the agent device that directly interacts with a user is not only a dedicated device, but also various CE apparatuses installed indoors, such as a television receiver, an air conditioner, a recorder, and a washing machine, and various information apparatuses each having an agent application residing therein, the various information apparatuses including an Internet of Thing (IoT) device, a portable information terminal such as a smart phone and a tablet, an interactive robot, a car navigation system installed inside a car, and the like (refer to, for example, Patent Document 1).

CITATION LIST

Patent Document

Patent Document 1: Japanese Unexamined Patent Application Publication No. 2017-527844
Patent Document 2: WO2014/203495
Patent Document 3: Japanese Patent Application Laid-Open No. 2007-143010
Patent Document 4: Japanese Patent Application Laid-Open No. 2016-100613

SUMMARY OF THE INVENTION

Problems to be Solved by the Invention

An object of the technology disclosed in the present description is to provide an information processing device that processes a voice-based agent interaction, and an information processing method, and to provide an information processing system.

Solutions to Problems

A first aspect of the technology disclosed in the present description is an information processing device including:
 a communication unit that receives information related to an interaction with a user through an agent residing in a first apparatus; and
 a control unit that controls an external agent service.

The control unit collects the information that includes at least one among an image or a voice of the user, information related to operation of the first apparatus by the user, and sensor information detected by a sensor with which the first apparatus is equipped.

In addition, the control unit executes calling after performing format conversion so as to cause the calling to conform to calling specifications of each external agent service. Specifically, the control unit voice-synthesizes contents of calling of the first external agent service, and performs calling of the first external agent service, or voice-synthesizes contents of calling of a second external agent service, and performs voice calling of an external agent device under the control of the second external agent service from the first apparatus.

In addition, a second aspect of the technology disclosed in the present description is an information processing device including:
 a communication unit that receives a response to a user, the response having been generated by processing information related to an interaction with the user; and
 an output unit that outputs the response.

Moreover, a third aspect of the technology disclosed in the present description is an information processing method including:
 a communication step of receiving information related to an interaction with a user through an agent residing in a first apparatus; and
 a control step of controlling an external agent service.

Further, a fourth aspect of the technology disclosed in the present description is an information processing method including:
 a communication step of receiving a response to a user, the response having been generated by processing information related to an interaction with the user; and
 an output step of outputting the response.

Furthermore, a fifth aspect of the technology disclosed in the present description is an information processing system including:
 a first apparatus in which an agent that interacts with a user resides;
 a communication unit that receives information related to the interaction with the user through the agent; and
 a control unit that controls an external agent service.

However, the "system" mentioned here means a product into which a plurality of devices (or function modules that realize specific functions respectively) is logically assembled, and thus it does not particularly matter whether or not the devices or the function modules are housed in a single case.

Effects of the Invention

According to the technology disclosed in the present description, an information processing device that processes a voice-based agent interaction and an information processing method, and an information processing system can be provided.

It should be noted that the effects described in the present description are to be construed as merely illustrative, and therefore the effects of the present invention are not limited to those described in the present description. In addition, the present invention may produce further additional effects in addition to the effects described above.

Still other objects, features and advantages of the technology disclosed in the present description will become apparent from the following detailed description based on the embodiments and accompanying drawings described below.

BRIEF DESCRIPTION OF DRAWINGS

FIG. 9 is a diagram illustrating an example of account management in an agent cloud platform 300.

FIG. 10 is a diagram illustrating a state in which the agent system 330 controls the external agent services 340A, 340B, and 340C in response to a state of a user.

MODE FOR CARRYING OUT THE INVENTION

Embodiments of the technology disclosed in the present description will be described below in detail with reference to the drawings.

Figure 1:
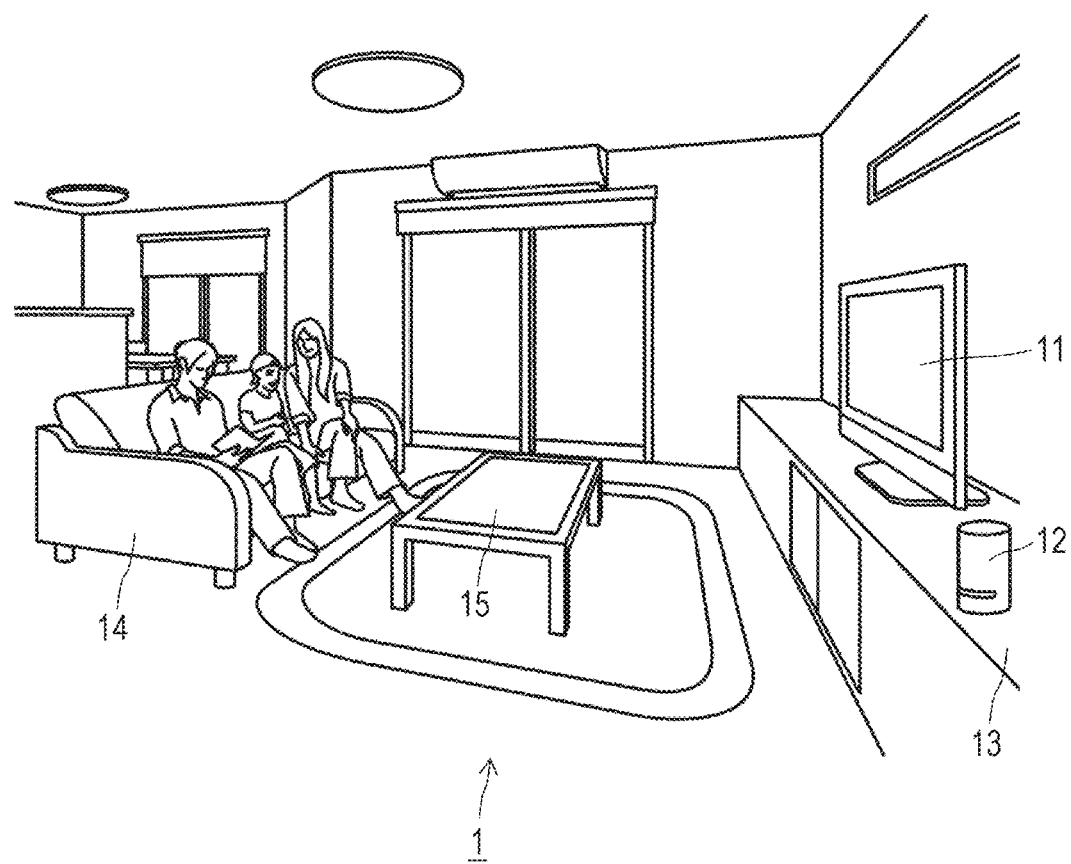
FIG. 1 is a drawing illustrating an example of an applicable environment for the technology disclosed in the present description.

FIG. 1 illustrates a living room 1 as an example of an applicable environment for the technology disclosed in the present description. A television receiver 11 and an agent device 12 are installed on a sideboard 13. As described later, the television receiver 11 has an agent application residing thereon, and is also capable of operating as an agent device.

In addition, in the living room 1, a sofa 14 is installed so as to face the television receiver 11, and a sofa table 15 is provided in front of the sofa 14.

In the example shown in FIG. 1, three persons who are parents and a child sit on the sofa 14. The three persons are viewers of a television program displayed on the television receiver 11, and are users of an agent or the agent device 12 that operates on the television receiver 11. The three persons make an inquiry to the agent, and wait for a response. In addition, it is assumed that each user can use a remote control (not illustrated) to perform various kinds of remote operation of the television receiver 11 including channel selection, sound volume adjustment, switching of input-output devices, and the like. Alternatively, each user can also instruct, by voice, the agent residing on the television receiver 11 to perform various kinds of operation of the television receiver 11 including channel selection, sound volume adjustment, switching of input-output devices, and the like.

A sound wave of a sound emitted from the television receiver 11 reaches the three persons sitting on the sofa 14 as a direct wave, and also reaches the three persons as reflected waves from a wall surface, a ceiling, and a floor surface. The sound emitted from the television receiver 11 includes a sound of a television program that is being received after channel selection, and a synthetic voice returned from the agent. Similarly, a sound emitted from the agent device 12 reaches the three persons sitting on the sofa 14 as a direct wave, and also reaches the three persons as reflected waves from a wall surface, a ceiling, and a floor surface.

It should be noted that the applicable environment for the technology disclosed in the present description is not limited to the living room such as that shown in FIG. 1, the living room being shared by family members in an ordinary household. The technology disclosed in the present description can also be applied to various rooms in which a television receiver for providing an agent function is installed, the rooms including a study that is a private room of a specific user, a bedroom, and the like. In addition, the technology disclosed in the present description can be applied to not only a household, but also an office of a company.

Figure 2:
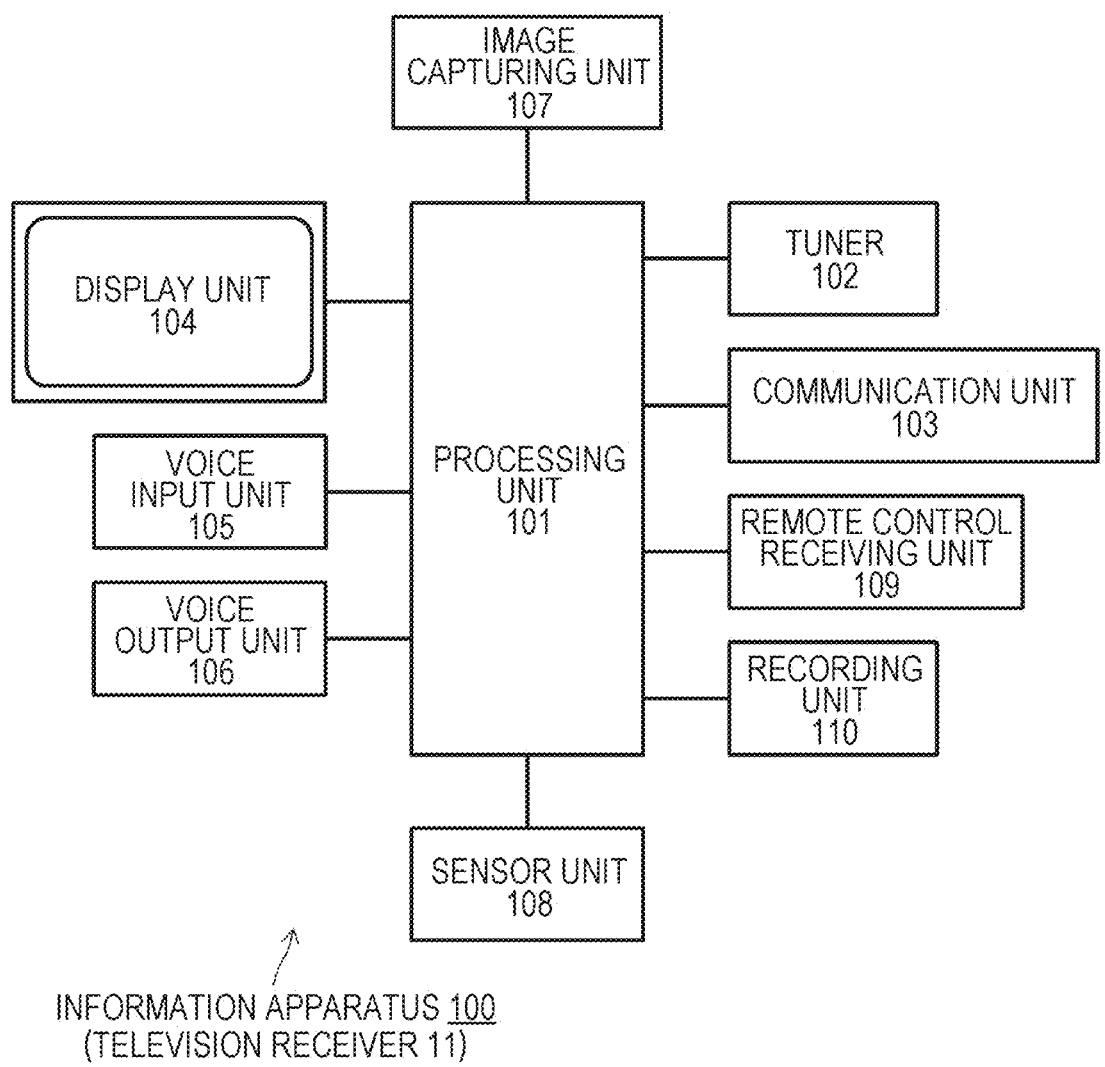
FIG. 2 is a diagram schematically illustrating a configuration example of an information apparatus 100 that is capable of operating as an agent device.

FIG. 2 schematically illustrates a configuration example of the information apparatus 100 that is capable of operating as an agent device. Here, the television receiver 11 in FIG. 1 is assumed as the information apparatus 100. The information apparatus 100 is provided with a processing unit 101, a tuner 102, a communication unit 103, a display unit 104, a voice input unit 105, a voice output unit 106, an image capturing unit 107, a sensor unit 108, a remote control receiving unit 109, and a recording unit 110.

The tuner 102 selects and receives a broadcast signal of terrestrial broadcasting and a broadcast signal of satellite broadcasting. In addition, the communication unit 103 is connected to an external network such as the Internet by using wired communication such as Ethernet (registered trademark) or wireless communication such as Wi-Fi (registered trademark). In addition, the communication unit 103 may be interconnected to each in-home CE apparatus through a home network, or may be further provided with an interface function with an IoT device, in conformity with standards including, for example, Digital Living Network Alliance (DLNA) (registered trademark).

The display unit 104 is configured by, for example, a liquid crystal, an organic EL element, or the like, is provided with a screen having a horizontal to vertical ratio of 16:9, and is used to display a video and an Electronic Program Guide (EPG) of program content that has been selected and received by the tuner 102, and data broadcast content, and to display an On Screen Display (OSD). It should be noted that a touch sensor may be superimposed on a partial or whole area of a screen of the display unit 104.

The voice input unit 105 is configured by a sound collection element such as a microphone, and is used to input a voice occurring in a room in which the information apparatus 100 is installed. Utterance by a viewer of a television program, or utterance by a user who uses a voice agent, can be mentioned as the voice occurring in the room. The voice input unit 105 may be provided with a microphone array into which a plurality of microphones is combined (a part of or whole microphone may be externally connected to the information apparatus 100. Alternatively, the voice input unit 105 may include a microphone mounted in the remote control for the television receiver 11, or may include a microphone mounted in an external device of the television receiver 11, the external device including a smart phone, a wearable apparatus, and the like). In a case where the voice input unit 105 is provided with a plurality of microphones, beamform processing enables a sound from a desired sound-source position (for example, a voice of a user who talks to a voice agent) to be increased, and in contrast, enables sounds from positions of unnecessary sound sources (for example, voices of other users, sounds output from other AV equipment in the room, etc.) to be suppressed.

The voice output unit 106 is configured by a sound generating element such as a speaker. The voice output unit 106 is used for voice output of program content and data broadcast content that have been selected and received by the tuner 102, output of a synthetic voice returned from the voice agent, and the like. Other than a cone type speaker, a flat panel type speaker (refer to, for example, Patent Document 3) can be used for the voice output unit 106. In addition, the voice output unit 106 may be provided with a speaker array into which a plurality of speakers is combined (a multi-channel speaker or a super multi-channel speaker) (a part of or whole speaker may be externally connected to the information apparatus 100). In a case where the voice output unit 106 is provided with a plurality of speakers, a sound image can be localized at a desired position (for example, a sound image of a voice of a voice agent is localized in a place that becomes a predetermined relative position relative to a user who has made an inquiry, or is localized in a place in which the sound image is not mixed with a sound of a television program), or it is possible to make a sound difficult to hear from places other than a desired position. In addition, it is also possible to use a sound field reproduction technique such as "wavefront synthesis" that absorbs a wavefront of a sound in a sound field by using a plurality of microphones, and reproduces the sound field on the basis of the obtained sound acquisition signal (refer to, for example, Patent Document 4).

The image capturing unit 107 is configured by a camera that includes, for example, an image sensor such as Complementary Metal Oxide Semiconductor (CMOS) and Charge Coupled Device (CCD), and mainly image-captures a user who is located in the front direction of the information apparatus 100 (for example, in front of the screen of the display unit 104). The image capturing unit 107 may be, for example, a stereo camera that uses two cameras, or a multi-eye camera that uses three or more cameras. In addition, a part of or whole camera may be externally connected to the information apparatus 100.

The sensor unit 108 mainly senses environmental information of the room in which the information apparatus 100 is installed. A configuration of the sensor unit 108 (in other words, a kind of sensor element to be included) may be arbitrarily determined. For example, the sensor unit 108 may include an object detection sensor, and a depth sensor. On the basis of a result of detection by the object detection sensor and the depth sensor (if required, in conjunction with a result of image recognition of an image captured by the image capturing unit 107), a layout of furniture installed in the room can be detected. In addition, the sensor unit 108 may be provided with an environment sensor that detects environmental information, the environment sensor including an illuminance sensor, a temperature sensor, a humidity sensor, and the like. In addition, the sensor unit 108 may be provided with an infrared sensor, and a human detection sensor. Further, the sensor unit 108 may be provided with a living-body sensor that detects pulsation, sweating, brain wave, myoelectric potential, expiration, and the like of a user. A part of or whole sensor unit that forms the sensor unit 108 may be externally connected to the information apparatus 100.

The remote control receiving unit 109 receives a remote control command that is transmitted from a remote control (not illustrated) by using infrared communication, short-distance wireless communication, or the like. An operator of the remote control is, for example, a viewing user of the television receiver 11 who is in the living room shown in FIG. 1.

The recording unit 110 is configured by, for example, a large-capacity recording device such as a Hard Disc Drive (HDD), and is mainly used to record program content received by the tuner 102. Although the recording unit 110 is arranged inside the information apparatus 100, there is also a case where the recording unit 110 is externally connected to the information apparatus 100 through an interface such as High Definition Multimedia Interface (HDMI) (registered trademark), and Universal Serial Bus (USB).

The processing unit 101 includes a processor and a memory, executes a program loaded into a memory to carry out various kinds of processing, and comprehensively controls operation in the information apparatus 100. In the processing unit 101, basically, various applications are executed under an execution environment provided by an operating system (OS). For example, in a case where a multiprocessor can be used, or in a case where multithreaded execution is supported by an OS, all processing units that can be executed in parallel are read into the memory in which the processing units can be executed in parallel.

Processing that can be mentioned as the processing executed in the processing unit 101 includes: operation in the apparatus 100 based on remote control commands received by the remote control receiving unit 109, the operation including channel selection, sound volume adjustment, recording, image quality adjustment, and the like; processing of outputting a video and a sound of program content selected and received by the tuner 102; reproduction output processing of program content recorded on the recording unit 110; execution of a data broadcast application received through the tuner 102 or the communication unit 103; and execution of various applications such as a voice agent. In addition, by causing the processing unit 101 to execute a plurality of agent applications in parallel, the information apparatus 100 is also capable of functioning as a plurality of agent devices.

Figure 3:
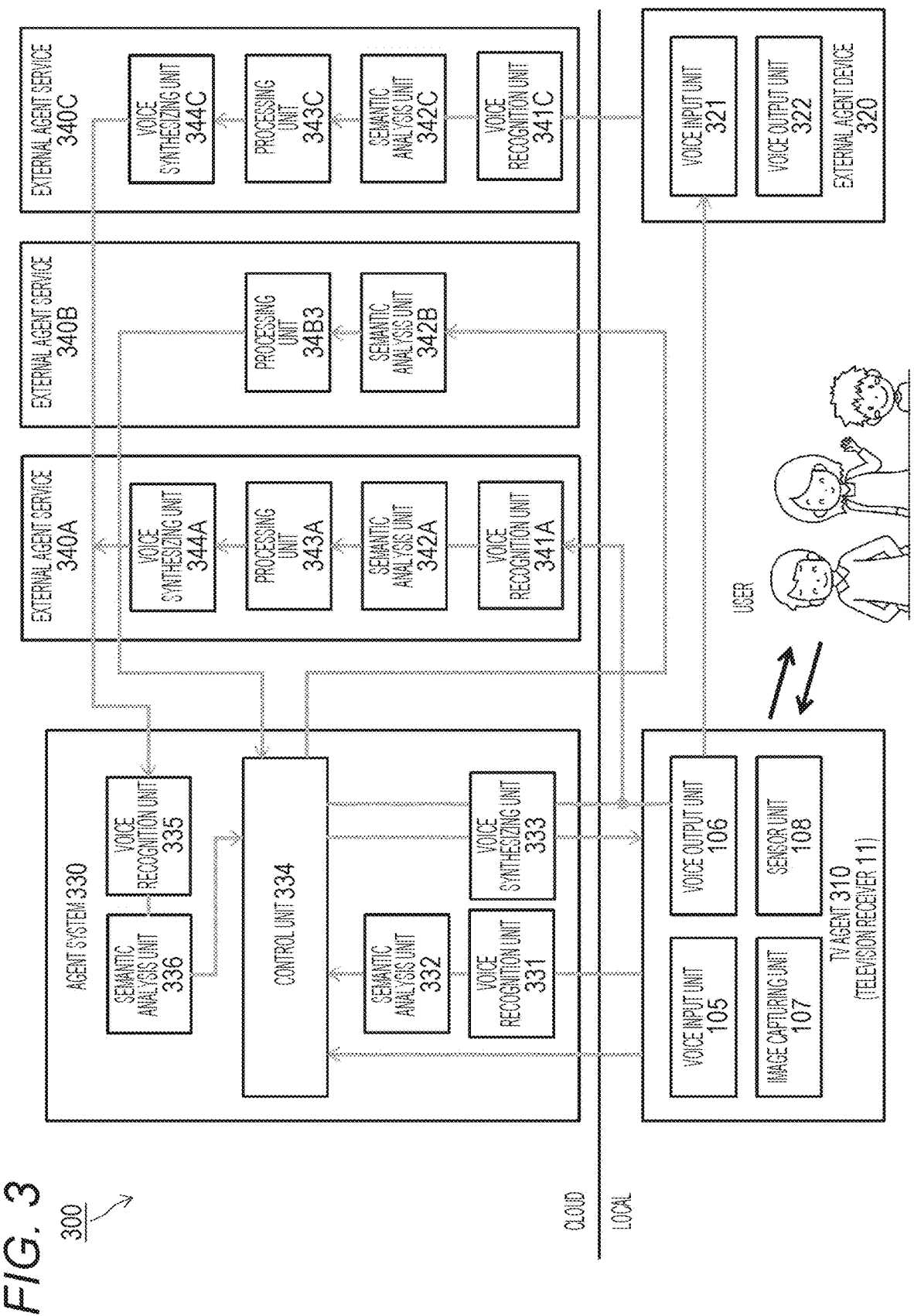
FIG. 3 is a diagram schematically illustrating a configuration example of an agent cloud platform that uses a cloud.

In general, the agent function is provided by cooperation between an agent device installed around a user and an agent service constructed on a cloud. FIG. 3 schematically illustrates a configuration example of an agent cloud platform 300 that uses a cloud. The agent cloud platform 300 is divided into the local side and the cloud side.

The local side of the agent cloud platform 300 corresponds to, for example, the living room 1 shown in FIG. 1, and includes the TV agent 310, and an external agent device 320.

The TV agent 310 is an agent that resides in the information apparatus 100 (corresponding to the television receiver 11 in FIG. 1), and is capable of utilizing each function module with which the information apparatus 100 is equipped, the function module including the voice input unit 105, the voice output unit 106, the image capturing unit 107, the sensor unit 108, and the like.

The external agent device 320 corresponds to the agent device 12 in FIG. 1. The external agent device 320 is a device used exclusively for voice agents, and is provided with a voice input unit 321 and a voice output unit 322 which are used to interact with a user. However, the external agent device 320 is not limited to the device used exclusively for voice agents, which is also called "smart speaker", "AI speaker", "AI assistant", or the like. The external agent device 320 may be a CE apparatus other than the television receiver 11, or may be a voice agent that resides in an IoT device, an information terminal, or the like.

Viewed from a user, the TV agent 310 does not differ from the external agent device 320 as an agent that performs a voice-based interaction. However, since the former interacts with the user through the television receiver 11 (or provides an agent service having high affinity with TV), the former is called "TV agent"; and since the latter interacts with the user outside the television receiver 11 (or provides an agent service that is little related to television broadcast services), the latter is called "external agent device". Thus, both of them are distinguished as a matter of convenience.

Meanwhile, the cloud side of the agent cloud platform 300 includes the agent system 330, and the plurality of external agent services 340A, 340B, 340C, . . . . Viewed from a user, the agent system 330 does not differ from the external agent service 340A, 340B, 340C, . . . from the viewpoint of providing an agent service that responds to an inquiry from a user on the local side. However, since the former provides an agent service by directly cooperating with the TV agent 310, the former is called "agent system"; and since the latter does not directly cooperate with the TV agent 310 but provides an agent service from the outside of the television receiver 11, the latter is called "external agent service". Thus, both of them are distinguished as a matter of convenience. The agent system 330 may be constructed on the server device that is managed by, for example, a product manufacturer or a selling agency of the television receiver 11. However, the agent system 330 is not limited by a specific management form. In addition, at least one of the external agent services 340A, 340B, 340C, . . . (in the example shown in FIG. 3, the external agent service 340C) directly cooperates with the external agent device 320 installed on the local side.

The agent system 330 is provided with a voice recognition unit 331, a semantic analysis unit 332, a voice synthesizing unit 333, and a control unit 334.

The voice recognition unit 331 voice-recognizes user's utterance collected by the voice input unit 105 on the TV agent 310 side, and converts the user's utterance into text information. The semantic analysis unit 332 subjects user's utterance data to semantic analysis on the basis of the voice-recognized text information. In addition, the voice synthesizing unit 333 converts the text information that is a response to the user into voice data. The voice data is transmitted to the TV agent 310, and is voice-output from the voice output unit 106 to a user who is an inquiry source. It should be noted that the TV agent 310 may be adapted to output a response to an inquiry from a user by using not only voice output but also video output on a screen of the display unit 104. In addition, the TV agent 310 may be adapted to output a response to an inquiry from a user by using together an output function of other CE apparatuses or other IoT devices that are connected to the television receiver 11 via a home network, for example.

The control unit 334 executes processing of responding to an inquiry from a user of the TV agent 310. For example, in order to cause the control unit 334 to respond to an inquiry from a user, the inquiry including searching for information referred to by the user, obtaining content requested by the user, and placing an order of a commodity, the control unit 334 may be provided with a learning function or an Artificial Intelligence (AI) function.

In addition, in order to respond to an inquiry from a user, the control unit 334 is capable of further calling the external agent services 340A, 340B, 340C, . . . . The control unit 334 may call all of requestable external agent services 340A, 340B, 340C, . . . , or may select and call some of external agent devices. For example, in a case where the external agent services 340A, 340B, 340C, . . . have specific areas of specialty respectively, the control unit 334 may accept or reject a request-destination external agent service according to contents of an inquiry from a user, profile information of the user who has made the inquiry, or the like. In addition, in a case where a user makes a voice input of a "start word" that designates a specific external agent service, the control unit 334 may request an external agent service corresponding to the input start word as it is, or may accept or reject a request-destination external agent service while the start word is taken into consideration.

In addition, there are considered some methods for calling external agent services 340A, 340B, 340C, . . . from the agent system 330. For example, text information obtained by subjecting an inquiry from a user to semantic analysis by the semantic analysis unit 332 may be transmitted to the external agent service 340B, or by transmitting voice data obtained by voice-synthesizing the text information by a voice synthesizing unit 333 to the external agent service 340A, an inquiry may be made in a mode like voice input from a user. Alternatively, in a case where the agent system 330 makes a request to the external agent service 340C, by transmitting voice data voice-synthesized by the voice synthesizing unit 333 to the TV agent 310, a sound that sounds like a voice of a user who makes an inquiry in a room is output from the voice output unit 106 of the TV agent 310, and thereby an inquiry can be made through the external agent device 320.

In addition, there are also considered some methods for responding to the agent system 100 from the request-destination external agent services 340A, 340B, 340C, . . . . For example, as with the external agent service 340B, there is a case where a processing result that includes text information or the like (or before voice synthesis) is transmitted to the agent service 330. In addition, as with the external agent services 340A and 340C, there is also a case where voice data obtained by voice-synthesizing the processing result is transmitted to the agent service 330. The agent service 330 is further provided with a voice recognition unit 335 that voice-recognizes voice data transmitted from, for example, the external agent services 340A and 340C, and a semantic analysis unit 336 that subjects the voice recognition result to semantic analysis.

In addition, the control unit 334 aggregates a response from each of the external agent services 340A, 340B, and 340C at a semantic-analysis result level, and generates a response sentence responding to an inquiry from a user. A method for aggregating a plurality of responses may be arbitrarily determined. A response from a specific external agent service may be selected by making a comparison with a response obtained by the agent system 330 itself; a response from a specific external agent service may be selected on the basis of a predetermined selection criterion including decision by majority or the like; or one response sentence may be generated by synthesizing responses from a plurality of external agent services. In any case, the voice synthesizing unit 333 converts a response sentence generated by the control unit 334 into voice data, and transmits the voice data to the TV agent 310. Subsequently, in the TV agent 310, a voice of a response to a user who is an inquiry source is output from the voice output unit 106 to the user.

It should be noted that among the voice recognition unit 331, the semantic analysis unit 332, the voice synthesizing unit 333, the control unit 334, the voice recognition unit 335, and the semantic analysis unit 336, a part or all of the function modules with which the agent system 330 is equipped may be incorporated into the TV agent 310. Alternatively, these function modules 331 to 336 may be constructed on one server device, or may be arranged in a plurality of server devices in a distributed manner.

Functional configurations of the respective external agent services 340A, 340B, 340C, . . . are substantially similar. A functional configuration of the external agent service 340C will be representatively described below.

The external agent service 340C is provided with a voice recognition unit 341C, a semantic analysis unit 342C, a processing unit 343C, and a voice synthesizing unit 344C.

The voice recognition unit 341C voice-recognizes an utterance collected by the voice input unit 321 of the external agent device 320, and converts the utterance into text information. It should be noted that there is also assumed a case where a voice collected by the voice input unit 321 includes not only an utterance of a user, but also a voice output from the voice output unit 106 of the TV agent 310.

The semantic analysis unit 342C subjects user's utterance data to semantic analysis on the basis of the voice-recognized text information. The processing unit 343C executes processing of responding to an inquiry from the user. For example, when a semantic analysis result shows that a "start word" that designates the external agent service 340C has been voice-input from the user, the processing unit 343C starts execution of processing.

The voice synthesizing unit 344C converts text information that is a response to the user into voice data. The voice data is transmitted to the external agent device 320, and is voice-output from the voice output unit 322 to a user who is an inquiry source. It should be noted that although the voice data generated by the voice synthesizing unit 322 is transmitted to the external agent device 320 and is voice-output, there is also assumed a case where the voice data is transmitted to the agent system 330, and is input into the voice recognition unit 335.

Incidentally, for simplification of drawing, FIG. 3 shows that one agent system 330 on the cloud side provides one TV agent 310 with an agent service. However, it is assumed that one agent system 330 concurrently provides a plurality of TV agents, which is operating on a plurality of television receivers, with agent services. In other words, in actuality, one agent system 330 concurrently provides TV agents of a large number of television receivers installed in households with agent services.

In addition, due to limitations of page space, FIG. 3 illustrates three external agent services 340A, 340B, and 340C. However, the number of external agent services that cooperate with the agent system 330 is not limited to three, and thus it is assumed that the agent system 330 cooperates with two or less or four or more external agent services.

In addition, although FIG. 3 illustrates one external agent device 320, the external agent device is not always an essential component when the technology disclosed in the present description is implemented. In other cases, it should be understood that even if two or more external agent devices coexist on the local side, the technology disclosed in the present description can be similarly realized.

The external agent services 340A, 340B, and 340C among the plurality of agent services shown in FIG. 3 are also called, for example, "AI agent" or "AI speaker", and are already widely used services at the time of the filing of the present application. It is assumed that this kind of external agent service subordinates an infinite number of external agent devices (corresponding to the external agent device 320 in FIG. 3) that can be connected via a wide area network such as the Internet. Each user can log in to an external agent service through an external agent device owned by himself/herself. Each external agent service sets an account for each user who has logged in thereto, and manages profile information and history information of the each user with the profile information and the history information associated with the account (hereinafter also referred to as "account switching" function). In addition, for example, by successively updating the profile information and the history information, or by adopting a learning function, every time an inquiry is received from a user, the external agent service is capable of providing a fine service that is customized or personalized for each individual user.

In addition, among the plurality of agent services shown in FIG. 3, the agent system 330 is assumed to be managed by, for example, a product manufacturer or a selling agency of the television receiver 11, and provides an agent service by directly cooperating with the TV agent 310. Although the agent system 330 is also an AI agent, it is assumed that users of the TV agent 310 are basically limited to users who view the television receiver 11. The agent system 330 recognizes an image and a voice that have been captured by the image capturing unit 107 and the voice input unit 105 of the television receiver 11 (that is to say, on the local side), identifies a user on the basis of a result of personal identification, and manages an account on a user basis. Subsequently, every time an inquiry is received from a user, or on the basis of a result of detection by the sensor unit 108 (may include the image capturing unit 107 and the voice input unit 105), by updating profile information and history information of each user, or by adopting a learning function, the agent system 330 is capable of providing a fine service that is customized or personalized for each individual user.

It should be noted that in the agent cloud platform 300 shown in FIG. 3, although the agent system 330 is configured to directly cooperate with the TV agent that resides in the television receiver 11, a type of apparatus with which the agent system 330 is capable of directly cooperating is not limited to a television receiver. For example, a modified example in which an agent residing in various kinds of information apparatuses directly cooperates with the agent system 330 is also assumed, the various kinds of information apparatuses including: information terminals that can be carried by a user, such as a smart phone and a tablet; wearable apparatus worn by a user, or various CE apparatuses such as an air conditioner, a recorder, and a washing machine; an IoT device; an interactive robot; a car navigation system installed inside a car, and the like. In addition, in a case where the agent system 330 cooperates with an apparatus other than television receivers, the external agent device 320 may be a voice agent that resides in a television receiver.

Subsequently, an operation example of the agent cloud platform 300 will be described.

Figure 4:
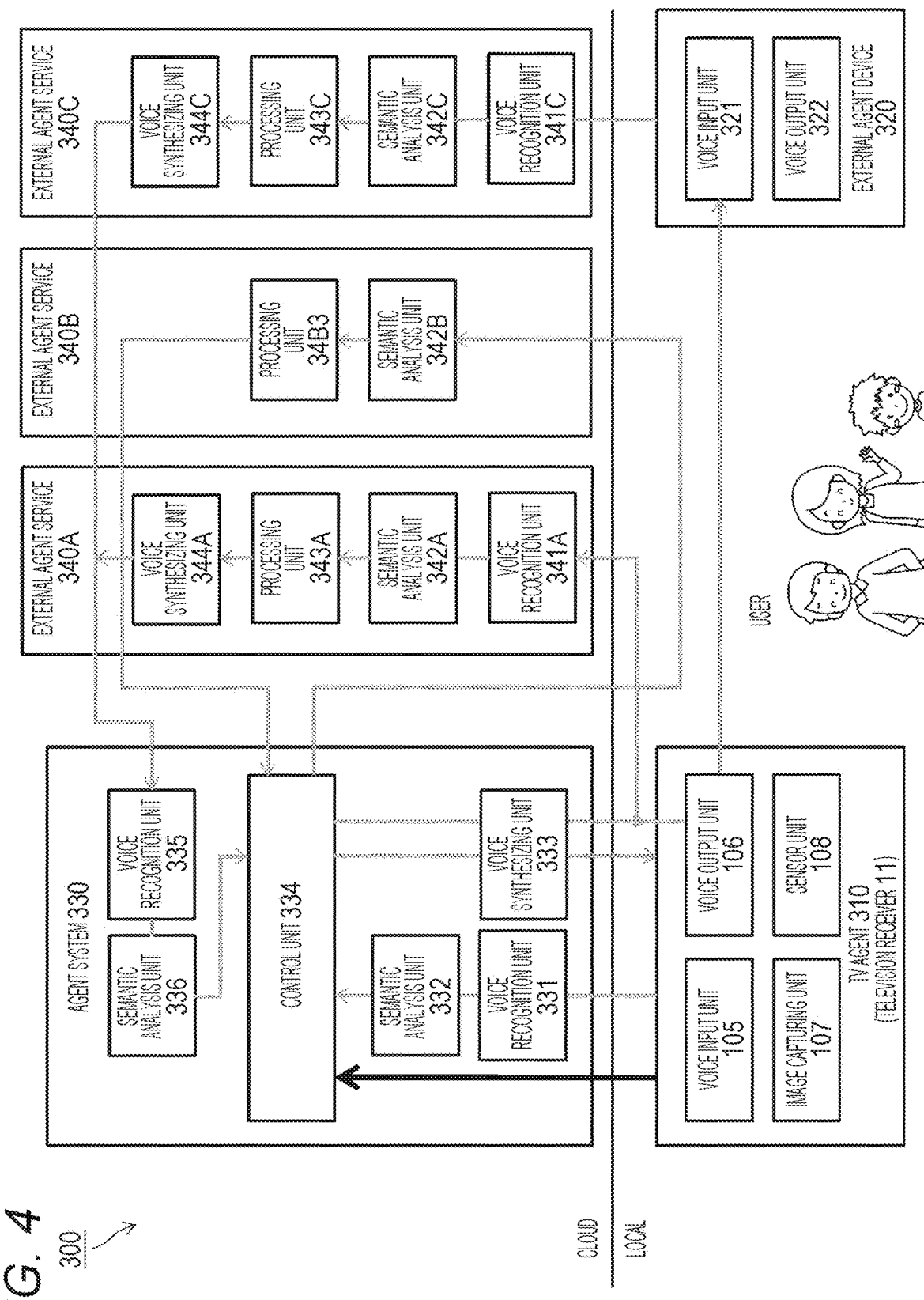
FIG. 4 is a diagram illustrating a state in which an agent system 330 collects information on the local side through a TV agent 310.

FIG. 4 illustrates a state in which the agent system 330 collects information on the local side through the TV agent 310.

The TV agent 310 always monitors, for example, a viewing history of television programs, a current viewing situation, a state (on/off, sound volume, image quality settings, etc.) of the television receiver 11 itself, a recording history, and an operation history of a remote control for the television receiver 11, and transmits these pieces of information to the agent system 330. On the agent system 330 side, these pieces of information related to a user's viewing history of television programs in the television receiver 11 are always collected from the TV agent 310, and are managed with the pieces of information associated with, for example, user's profile information and user's account information. In addition, the TV agent 310 may transmit, to the agent system 330, information obtained from each CE apparatus that is interconnected with the television receiver 11 via a home network according to standards such as DLNA (registered trademark), or obtained from an IoT device installed in the same room.

In addition, the TV agent 310 transmits, to the agent system 330, a face image of a user image-captured by the image capturing unit 107 with which the television receiver 11 is provided, and voice data of the user input into the voice input unit 105. On the agent system 330 side, the image received from the TV agent 310 is subjected to facial recognition, and the voice data is voice-recognized, thereby performing personal identification processing. Alternatively, the TV agent 310 may be adapted to subject the image captured by the image capturing unit 107 to image recognition, or to subject the voice input into the voice input unit 105 to voice recognition, and then to transmit a result of personal identification processing to the agent system 330. The agent system 330 may be adapted to set a new user account every time a person is newly identified. In addition, the agent system 330 may be adapted to distribute pieces of information, which have been collected from the local side through the TV agent 310, on a user basis, and to manage the pieces of information by associating each of the pieces with the user account. Moreover, the agent system 330 may be adapted to collect information related to a state of a user (for example, whether or not the user is viewing a television program that is being selected and received by the television receiver 11) on the basis of image data and voice data that have been received from the TV agent 310.

In addition, the TV agent 310 transmits, to the agent system 330, detected data that has been detected by the sensor unit 108 with which the information apparatus 100 is provided. In a case where the sensor unit 108 includes an object detection sensor, a depth sensor, and an environment sensor (an illuminance sensor, a temperature sensor, a humidity sensor, etc.) that detects environmental information, the agent system 330 may collect these pieces of sensor information to manage environmental information of users. Further, in a case where the sensor unit 108 is provided with a living-body sensor that detects pulsation, sweating, brain wave, myoelectric potential, expiration, and the like of a user, the agent system 330 may collect these pieces of sensor information from the TV agent 310 to manage biological information on a user basis.

Incidentally, there is also a case where the information obtained by the TV agent 310 through the television receiver 11 includes user's sensitive information. Accordingly, the TV agent 310 may be adapted to mask user's sensitive information before providing information on the local side to the agent system 330. Masking of sensitive information will be described in detail later.

The TV agent 310 and the agent system 330 may be adapted to perform account management on an individual basis by dividing a user's profile by personal identification. For example, personal identification can be performed by subjecting a face image of a user image-captured by the image capturing unit 107 to facial recognition, or by subjecting a user's utterance input from the voice input unit 105 to voice recognition. In addition, the TV agent 310 and the agent system 330 may perform individual identification on the basis of a viewing history of television programs, an operation history of the remote control, or the like. For example, tendencies of viewing preferences can be separated on a user basis from habits of viewing television programs, the habits including a day of the week, a time zone, and the like, and therefore by separating, on a user basis, operation habits of operating the remote control and various apparatuses, the operation habits can be used for personal identification.

FIG. 9 illustrates an example of account management in the agent cloud platform 300.

On the basis of, for example, a result of facial recognition of a user's image captured by the image capturing unit 107, the TV agent 310 grasps a family structure composed of a "father", a "mother", and a "child", sets respective accounts of the "father", the "mother", and the "child", and manages a profile of each family member.

In addition, the agent system 330 shares account information of the users with the TV agent 310. In other words, in the example shown in FIG. 9, the agent system 330 grasps a family structure composed of a "father", a "mother", and a "child", and sets respective accounts of the "father", the "mother", and the "child". However, the agent system 330 is not required to personally identify the users, and the agent system 330 may manage the accounts by, for example, family relationships or the like.

Meanwhile, for example, when the external agent service 340C is called from the agent system 330, and when a user's profile is divided so as to be called from the external agent device 320, the external agent service 340C may divide the profile to set accounts. In addition, the external agent device 320 may be adapted to set an account by identifying a voice obtained when being called by a user. In the example shown in FIG. 9, the external agent service 340C and the external agent device 320 share account information of "father".

It should be noted that at the time of the filing of the present application, there is no special arrangement as to how to manage user's accounts by an agent. In the present embodiment, it is assumed that the agent system 330 is capable of setting accounts of a plurality of users on the basis of personal identification in one TV agent 310 (in the example shown in FIG. 9, respective accounts of the "father", the "mother", and the "child" are set).

In addition, it is assumed that the external agent services 340A, 340B, and 340C are each capable of arbitrarily performing account management. For example, in a case where only one account of a representative user is set for one external agent device 320, while an account is assigned to one external agent device 320 as one user, profiles of a plurality of users may be allowed to be registered under the user account, or a plurality of sub-users may be allowed to be registered under the account of one user. In addition, in a case where each of the external agent services 340A, 340B, and 340C is called from the agent system 330 as well, each of the external agent services 340A, 340B, and 340C can apply similar account management to the agent system 330, the account management including: setting only one account of a representative user; assigning profiles of a plurality of users under one user account; and registering a plurality of sub-users under one user account.

Figure 5:
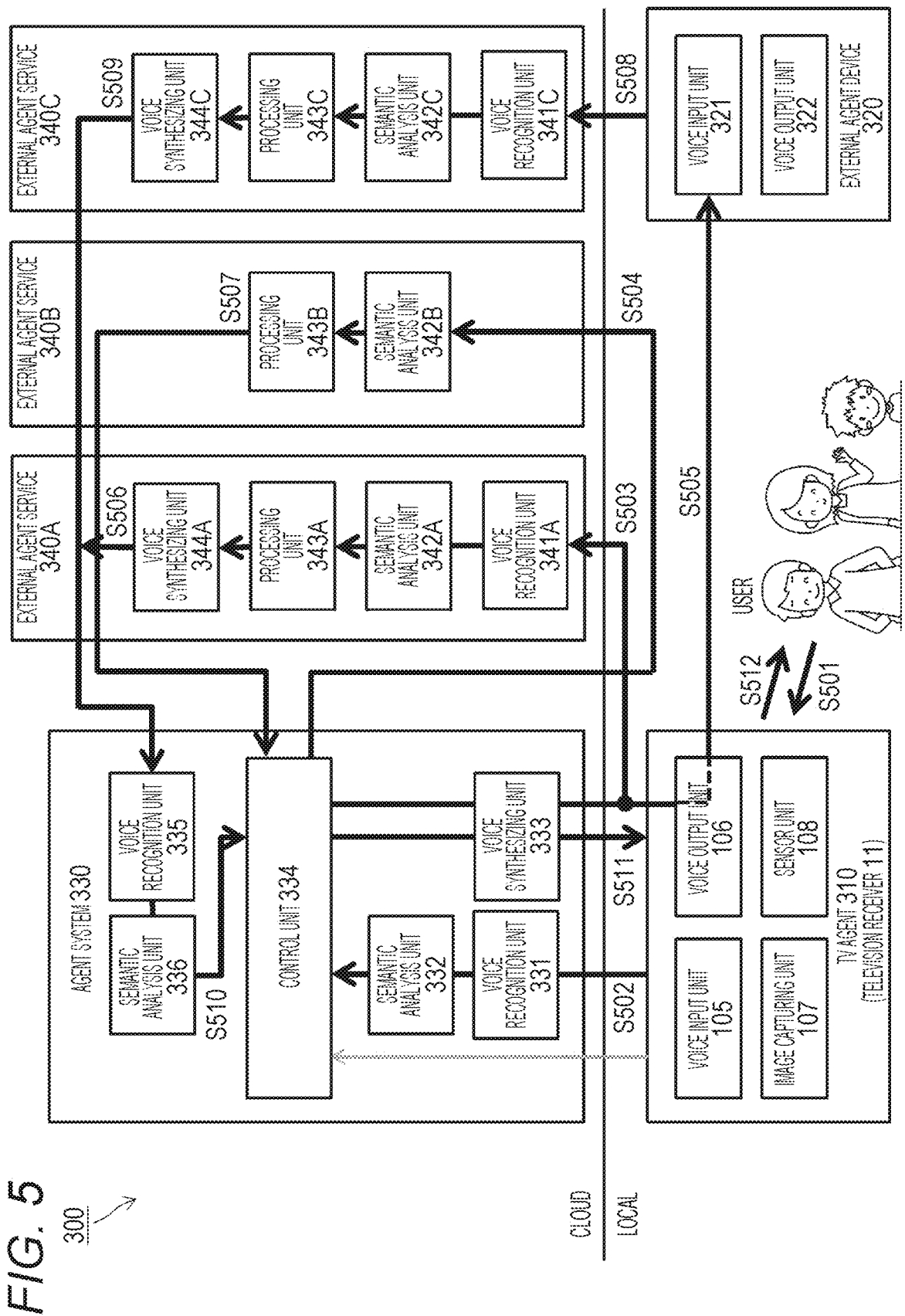
FIG. 5 is a diagram illustrating a state in which the agent system 330 calls external agent services 340A, 340B, and 340C.

FIG. 5 illustrates a state in which the agent system 330 calls external agent services 340A, 340B, and 340C. For example, when a user makes an inquiry to the TV agent 310, the agent system 330 calls the external agent services 340A, 340B, and 340C.

When the user makes an inquiry to the TV agent 310 by voice (S501), the voice input unit 105 collects a voice of the user, and transmits the voice to the agent system 330. Subsequently, in the agent system 330, the voice recognition unit 331 voice-recognizes the voice of the user, and the semantic analysis unit 332 performs semantic analysis (S502). In addition, in order to respond to the inquiry from the user, the control unit 334 calls the external agent services 340A, 340B, and 340C.

At this time, the control unit 334 may call all of callable external agent services 340A, 340B, and 340C, or may selectively call any of external agent services. For example, according to contents of an inquiry from a user, profile information of the user who has made the inquiry, or the like, the control unit 334 may accept or reject an external agent service to call the external agent service. In addition, in a case where a user makes a voice input of a "start word" that designates a specific external agent service, the control unit 334 may call an external agent service corresponding to the input start word as it is, or may accept or reject an external agent service to call the external agent service while the start word is taken into consideration.

Even in a case where any external agent service is called, the agent system 330 subjects the input voice input from the user to voice recognition and semantic analysis, and subsequently, after the control unit 334 performs format conversion so as to conform to calling specifications of each external agent service, the agent system 330 executes calling.

In a case where the agent system 330 calls the external agent service 340A, since the external agent services 340A supports calling by voice, the agent system 330 converts contents of an inquiry to the external agent service 340A into voice data by the voice synthesizing unit 333, the contents having been generated by the control unit 334, and then transmits the voice data to the external agent service 340A (S503). The voice data converted by the voice synthesizing unit 333 may be substantially the same as voice data transmitted from the TV agent 310, or may be voice data, the contents of which have been processed by the control unit 334, for example.

In this case, in the external agent service 340A, voice data transmitted from the agent system 330 is subjected to voice recognition by the voice recognition unit 341A, and is further subjected to semantic analysis by the semantic analysis unit 342A. The processing unit 343A then executes processing of responding to an inquiry from the agent system 330. Subsequently, text information that is a processing result of an inquiry from the agent system 330 is converted into voice data by the voice synthesizing unit 344A, and the voice data is then returned to the agent system 330 (S506).

In addition, in a case where the agent system 330 calls the external agent service 340B, since the external agent service 340B supports calling by a voice recognition result, the agent system 330 transmits contents of an inquiry to the external agent service to the external agent service 340B as it is (that is to say, without voice-synthesizing the contents), the contents having been generated by the control unit 334 (S504). Contents of an inquiry to the external agent service, the contents having been generated by the control unit 334, may be substantially the same as a voice recognition result of voice data transmitted from the TV agent 310, or may be voice data, the contents of which have been processed by the control unit 334, for example.

In this case, in the external agent service 340B, an inquiry from the agent system 330 is subjected to semantic analysis by a going analysis unit 343B, and the processing unit 343B executes processing of responding to the inquiry from the agent system 330, and returns the processing result to the agent system 330 as it is (that is to say, without voice-synthesizing the processing result) (S507). The control unit 334 on the agent system 330 side prepares Application Programming Interface (API) used to receive a response from the external agent device 320.

In addition, in a case where the agent system 330 calls the external agent service 340C, since the external agent service 340C supports calling from the external agent device 320 cooperating therewith, the agent system 330 converts contents of an inquiry to the external agent service into voice data by the voice synthesizing unit 333, the inquiry having been generated by the control unit 334, and then transmits the voice data to the TV agent 310, which causes the external agent device 320 to be called from the TV agent 310 by voice (S505). The voice that calls the external agent device 320 from the TV agent 310 may be substantially the same as the voice used when the user has made the inquiry to the TV agent 310 in S501, or may be a voice, the contents of which have been processed by the control unit 334, for example. In addition, the voice may include a "start word" used to start the external agent device 320.

In this case, a voice collected by the voice input unit 321 of the external agent device 320 is transmitted to the external agent service 340C (S508). In addition, in the external agent service 340C, voice data transmitted from the external agent device 320 is subjected to voice recognition by the voice recognition unit 341C, and is further subjected to semantic analysis by the semantic analysis unit 342C. The processing unit 343C then executes processing of responding to an inquiry from the agent system 330. Subsequently, text information that is a processing result of the inquiry from the agent system 330 is converted into voice data by the voice synthesizing unit 344C, and the voice data is then returned to the agent system 330 (S509).

In the agent system 330, a voice-data processing result returned from each of the external agent service 340A and the external agent service 340C is subjected to voice recognition by the voice recognition unit 335, and a result of the voice recognition is further subjected to semantic analysis by the semantic analysis unit 336, and is then supplied to the control unit 334. In addition, the control unit 334 receives a response by API calling from the external agent service 340B.

The control unit 334 aggregates a response from each of the external agent services 340A, 340B, and 340C at a semantic-analysis result level, and generates a response sentence responding to the inquiry from the user. A method for aggregating a plurality of responses may be arbitrarily determined. A response from a specific external agent service may be selected by making a comparison with a response obtained by the agent system 330 itself, or a response from a specific external agent service may be selected on the basis of a predetermined selection criterion including decision by majority or the like. Alternatively, one response sentence may be generated by synthesizing responses from a plurality of external agent services.

The voice synthesizing unit 333 converts a response sentence generated by the control unit 334 into voice data, and transmits the voice data to the TV agent 310 (S511). Subsequently, in the TV agent 310, a voice of a response to a user who is an inquiry source is output from the voice output unit 106 to the user (S512).

In short, by using the TV agent 310 residing on the television receiver 11 installed in the room in which the user exists, the agent system 330 provides an agent service mainly using voice interaction. In addition, other than returning, to a user, a result of processing an inquiry from the user by itself, by calling the external agent services 340A, 340B, and 340C, the agent system 330 is capable of responding to the user by utilizing an external resource as well. The agent system 330 is capable of calling each of the external agent service 340A, 340B, and 340C by making a conversion into a format that conforms to calling specifications for each of the external agent services 340A, 340B, and 340C. The agent system 330 is expected to return a higher quality response to the user by using calling of the external agent service 340A, 340B, and 340C.

Here, as one problem produced when the agent system 330 calls the external agent services 340A, 340B, and 340C, there can be mentioned a problem that a plurality of pieces of user information is mixed.

Figure 6:
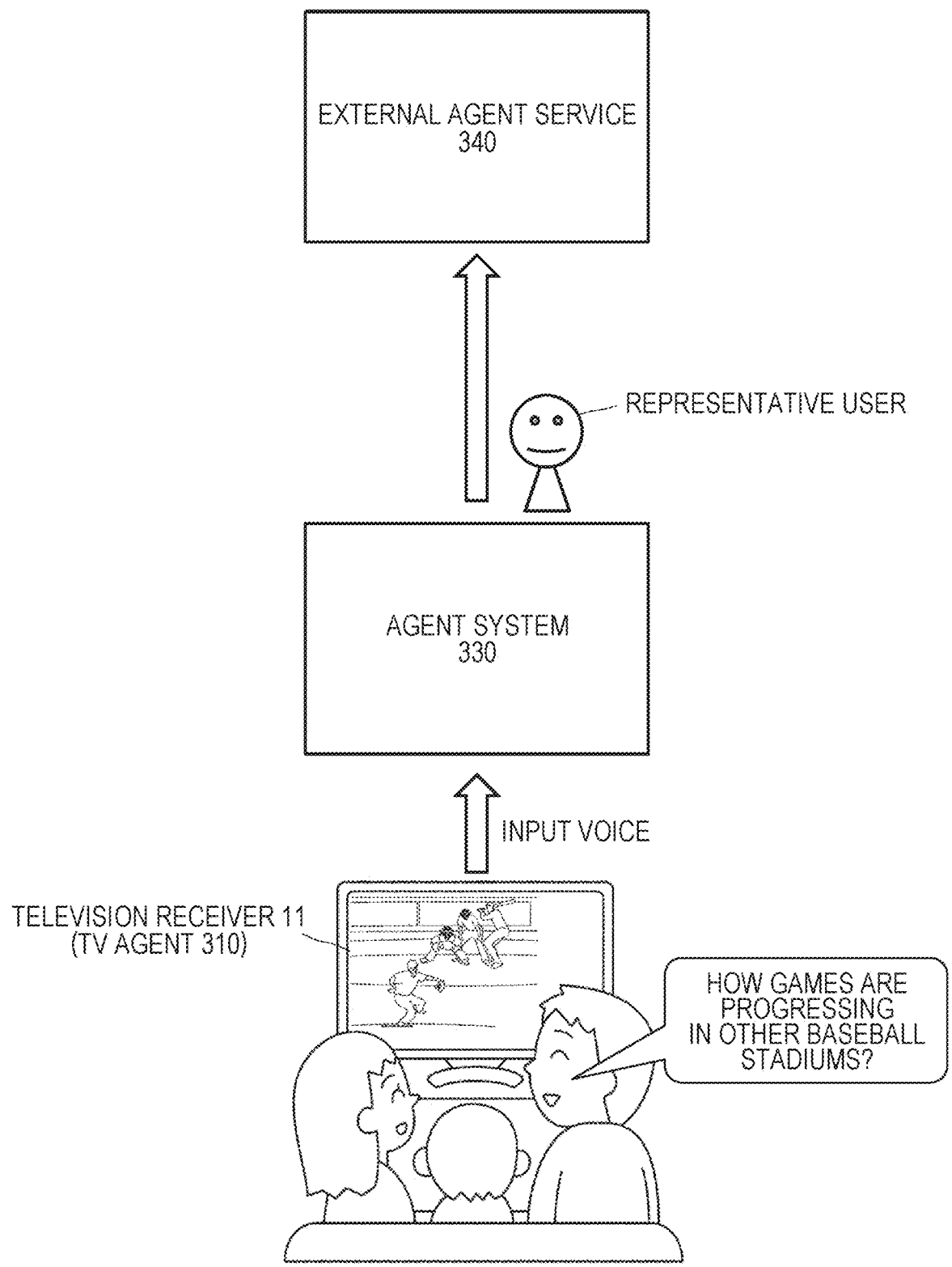
FIG. 6 is a diagram illustrating a state in which the agent system 330 calls the external agent services 340.

It is assumed that when family members are viewing a television program that is being selected and received by the television receiver 11 in the living room as shown in FIG. 6, one family member has made an inquiry to the TV agent 310. When the agent system 330 calls the external agent services 340, even in a case where anyone among the family members makes an inquiry, the inquiry is made by an account of the same user that is "agent system 330", and accordingly pieces of information (profile information, history information, etc.) of all family members are mixed. For example, even if anyone among the family members makes an inquiry to the TV agent 310, if the agent system 330 always synthesizes the same voice to call the external agent service 340A, the external agent service 340A is not capable of grasping who has made the inquiry. As the result, even if the external agent service 340 is equipped with an account switching function, it becomes difficult to provide a fine service corresponding to each user that is an inquiry source.

The agent system 330 is capable of subjecting an image of a user captured by the image capturing unit 107 to facial recognition, subjecting a voice input by the voice input unit 105 to voice recognition, identifying a profile of a user that is an inquiry source on the basis of a viewing history and a remote control operation history that have been collected through the television receiver 11, or a result of detection by the sensor unit 108, and the like.

Accordingly, the agent system 330 identifies a profile of a user who has made an inquiry by voice, and maps the profile of the user in accordance with an account switching function of the external agent service 340, and performs calling differently by using the profile.

For example, in a case where the agent system 330 calls the external agent service 340A or 340C, in the case of an inquiry from the father, adult male tone and timbre are synthesized to perform calling, in the case of an inquiry from the mother, adult female tone and timbre are synthesized to perform calling, and in the case of an inquiry from the child, child tone and timbre are synthesized to perform calling. In addition, in a case where the agent system 330 calls the external agent service 340B, in the case of an inquiry from the father, calling is performed by a calling sentence having an adult male-like tone, and in the case of an inquiry from the child, calling is performed by a calling sentence having a childish tone. Needless to say, the agent system 330 may add user's profile information as metadata to call the external agent service 340.

Each of the external agent services 340A, 340B, and 340C identifies a profile of a user on the basis of how to call the agent system 330 to perform account switching as appropriate, and returns a response to the inquiry to the agent system 330.

In each of the external agent services 340A, 340B, and 340C, there are various methods for account switching. For example, every time a profile is switched when an inquiry has been received from the agent system 330, an individual user account may be assigned. In addition, while an account is assigned to the agent system 330 as one user, a plurality of profiles for respective family members may be registered under the user account. Alternatively, while an account is assigned to the agent system 330 as one user, respective family members may be registered as sub-users under the user account.

Figure 7:
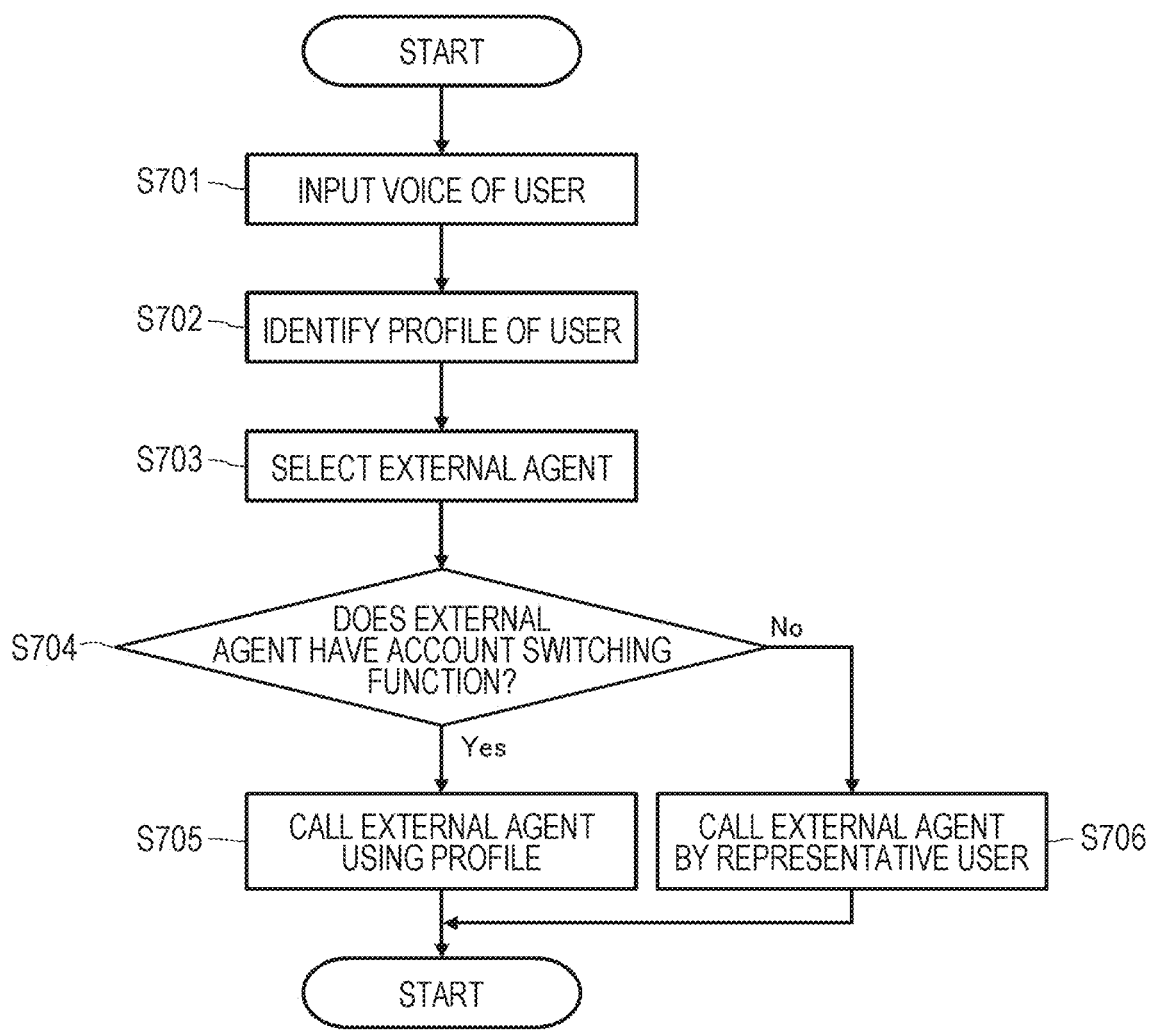
FIG. 7 is a flowchart illustrating processing steps performed when the agent system 330 differently calls external agent services 340 by using user's profile information.

FIG. 7 illustrates, in a flowchart format, processing steps performed when the agent system 330 differently calls external agent services 340 by using user's profile information.

When the agent system 330 inputs a voice from the user through the TV agent 310 (step S701), the agent system 330 identifies a profile of the user on the basis of a result of facial recognition of a user' image captured by the image capturing unit 107, a result of voice recognition of an input voice, and a result of detection by the sensor unit 108 (step S702).

Next, the agent system 330 subjects a voice that has been input in step S701 to semantic analysis, and selects an external agent service that should be called (step S703).

Next, the agent system 330 checks whether or not the selected external agent service has an account switching function (step S704).

Here, in a case where a called external agent service has an account switching function (Yes, in step S704), by using a profile of the user identified in step S702, the agent system 330 generates calling that conforms to the external agent service, and executes the calling (step S705). For example, the agent system 330 calls the external agent service with a tone and a timbre that are suitable for a profile including an age, a sex, and the like of the user.

Meanwhile, in a case where the called external agent service does not have an account switching function (No, in step S704), without using the profile of the user identified in step S702, the agent system 330 executes calling of the external agent service by a representative user (step S706).

In addition, as another problem produced when the agent system 330 calls the external agent services 340A, 340B, and 340C, there can be mentioned a problem that sensitive information of a user will be leaked out.

In a use mode in which the voice input unit 105 inputs a voice in the television receiver 11 installed in the living room, family members are apt to unconsciously make conversation including a word related to sensitive information, and thus an inquiry from a user to the agent system 330 may include the sensitive information. In other cases, there is also a possibility that although a user does not intend to make an inquiry, it will be automatically determined on the agent system 330 side that an inquiry has been made, and consequently a service will be started.

In the standards for protection and management of personal information JIS Q 15001:2006, there are mentioned, as sensitive information, "issues relating to thought, creed, and religion", "issues that cause social discriminations such as race, nation, family origin, and registered domicile (excluding the case of information only about the prefecture where the registered domicile exists), physical and mental disorder, criminal record, and others", "issues relating to the actions of group activities such as labor's right to organize, collective bargaining, and others", "issues relating to the exercise of political right such as participation in a mass demonstration, exercise of the right of petition, and others", and "issues relating to health care and sexual life". In addition, besides the issues prescribed in the standards such as those described above, various kinds of information having business, financial, or personal characteristics, such as a password and an account number, are also sensitive personal information. If such sensitive information is taken out, used, and spread by an illegal person, various risks are involved, for example, personality and property of an individual are violated. Additionally, it is often the case that a video obtained by image-capturing a state of a household in a living room or the like by the image capturing unit 107 includes various kinds of sensitive information that should be protected, the sensitive information including a face image.

Some technologies for protecting sensitive information are known. For example, a device that stores sensitive information is operated in a mode having a high security level. However, in a case where information is collected by using the voice input unit 105, the image capturing unit 107, the sensor unit 108, and the like that are built into (or, that are externally connected to) the television receiver 11 installed in the living room, it is not possible to prevent sensitive information from being mixed.

If the agent system 330 calls the external agent services 340A, 340B, and 340C with the sensitive information included therein, there is a possibility that the sensitive information will be spread starting from any of the external agent services, and will be illegally used. In addition, by using a method in which among pieces of information collected from the TV agent 310, sensitive information is simply colored by the agent system 330 in black so as to hide the sensitive information, contents of an inquiry cannot be read, and consequently the external agent services 340A, 340B, and 340C cannot provide normal agent services.

Accordingly, by replacing sensitive information included in an inquiry from a user with other information, the agent system 330 calls the external agent services 340A, 340B, and 340C while keeping the contents themselves in a readable state.

For example, in a case where an inquiry from a user includes a disease name, the disease name is replaced with a word "disease", in a case where the inquiry from the user includes a personal name, the personal name is replaced with a word that cannot identify an individual, such as "person", "father", "he" (pronoun), and "person like xxx", and in a case where the inquiry from the user includes "address", street address and town and village names are removed so as to keep a state in which although an individual cannot be completely identified, an intention of an inquiry can be read. In addition, in the case of an inquiry that includes a user's video and a user's voice, a face image and a voice of a user are replaced with an average face image and an average voice, the age and sex of which are the same as those of the user, and thereby an individual is prevented from being identified while keeping a profile of the user.

In addition, the agent system 330 may be provided with a database used to replace wording, an image, and a voice that include sensitive information as described above, or may be capable of using this kind of external database.

Figure 8:
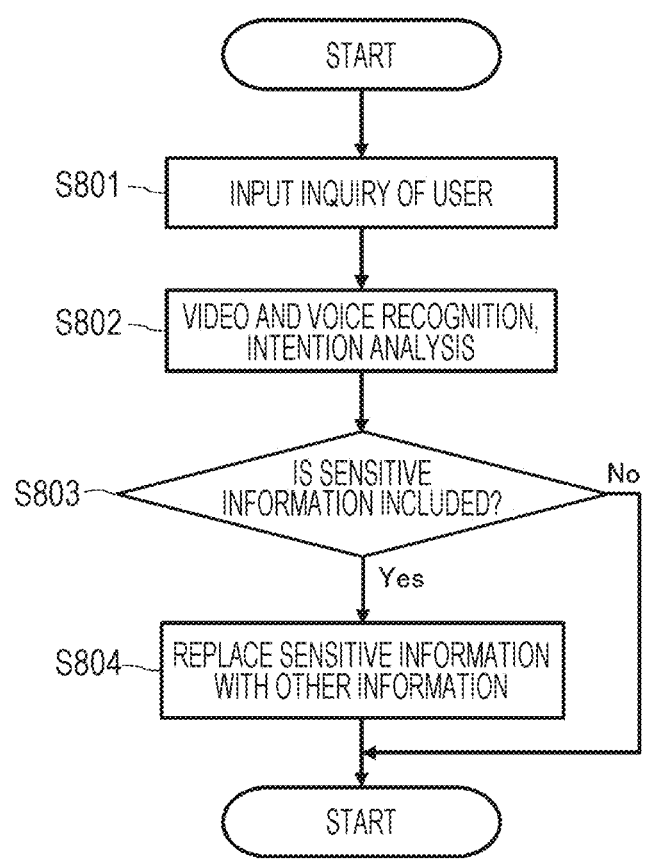
FIG. 8 is a flowchart illustrating processing steps performed when the agent system 330 differently calls the external agent services 340 while protecting user's sensitive information.

FIG. 8 illustrates, in a flowchart format, processing steps performed when the external agent services 340 are differently called while user's sensitive information is protected.

When the agent system 330 inputs an inquiry from a user through the TV agent 310 (step S801), the agent system 330 subjects a video and a voice included in the inquiry to recognition processing, and analyzes an intention of the inquiry (step S802).

Next, the agent system 330 checks, on the basis of a recognition result and an analysis result in step S802, whether or not sensitive information of the user is included in the video, the voice, or the inquiry (step S803).

Subsequently, in a case where sensitive information of the user is included in information that has been input through the TV agent 310 (Yes, in step S803), the agent system 330 replaces the sensitive information with other information while an inquired intention is kept in a readable state (step S804).

In step S804, for example, in a case where the inquiry from the user includes a disease name, the disease name is replaced with a word "disease", in a case where the inquiry from the user includes a personal name, the personal name is replaced with a word that cannot identify an individual, such as "person", "father", "he" (pronoun), and "person like xxx", and in a case where the inquiry from the user includes "address", street address and town and village names are removed. In addition, a face image and voice of the user are replaced with an average face image and an average voice, the age and sex of which are the same as those of the user.

In short, when the agent system 330 calls the external agent services 340A, 340B, and 340C to respond to an inquiry from a user, the agent system 330 becomes a gateway, so to speak, and consequently mask processing can be performed so as to prevent sensitive information from flowing out to the external agent services 340A, 340B, and 340C.

It should be noted that although FIG. 8 shows an example in which when the agent system 330 calls the external agent services 340A, 340B, and 340C, the agent system 330 masks sensitive information, the TV agent 310 may mask sensitive information of a user when the agent system 330 collects information on the local side.

The above explanation has been made focusing on the operation of responding to an inquiry from a user by the agent system 330 or the external agent services 340A, 340B, and 340C. The agent system 330 and the external agent services 340A, 340B, and 340C are also capable of voluntarily talking to a user. However, if a user is talked to from the TV agent 310 or the external agent device 320 while the user is viewing a television program, the user is hindered from viewing the television program. In addition, in a case where a user is viewing a recorded program, or when the user is using an apparatus other than the television receiver 11 (for example, when the user is interfering with music, when the user is making a telephone call, when the user is playing a game) as well, the similar applies thereto.

The agent system 330 is capable of determining a viewing state of a user through the TV agent 310 that resides in the television receiver 11, and is capable of appropriately controlling the timing of talking to the user on the basis of a result of the determination. In contrast, the external agent service 340C is capable of grasping a state of a user only through a voice input into the voice input unit 321 of the external agent device 320. Even in a voiceless state in which a user does not utter, it is not possible to determine whether talking to the user is allowed or the user is silently viewing a television program.

Accordingly, the agent system 330 is configured to determine a state of a user on the basis of information on the local side collected through the TV agent 310, and to control the operation of the external agent according to the state of the user.

Specifically, when the user is viewing a television program, the agent system 330 disables the external agent service 340A, 340B, and 340C. In contrast, when the user ends viewing of the television program, the agent system 330 enables the external agent service 340A, 340B, and 340C.

In addition, in a case where an inquiry can be made to the agent system 330 from the external agent services 340A, 340B, and 340C, the external agent services 340A, 340B, and 340C may be adapted to make an inquiry to the agent system 330 about a state of a user, or as to whether or not an independent action can be executed, before executing the independent action. When a user is viewing a television program, the agent system 330 responds to an inquiry by indicating that an independent action cannot be executed, and suppresses calling of the user from the TV agent 310 or the external agent device 320. In contrast, if the user ends viewing of the television program, the agent system 330 responds to an inquiry indicating that an independent action can be executed. It should be noted that the external agent services 340A, 340B, and 340C are capable of making an inquiry to the agent system 330 by, for example, a voice or API calling.

FIG. 10 illustrates a state in which the agent system 330 controls the external agent services 340A, 340B, and 340C in response to a state of a user.

The agent system 330 obtains, through the TV agent 310, a situation on the local side, that is to say, a viewing history of television programs, a current viewing situation, a state (on/off, sound volume, image quality settings, etc.) of the television receiver 11 itself, a recording history, an operation history of a remote control for the television receiver 11, and the like (S1001), and determines, by the control unit 334, whether or not a user is viewing a television program.

When the user is viewing a television program, the control unit 334 disables the external agent services 340A, 340B, and 340C. The control unit 334 carries out disabling processing in a format that conforms to calling specifications of each external agent service. Specifically, when the control unit 334 generates an instruction to disable the external agent service 340A, the instruction is converted into voice data by the voice synthesizing unit 333, and is then transmitted to the external agent service 340A (S1002). In addition, the control unit 334 transmits an instruction to disable the external agent service 340B as it is (in other words, without voice-synthesizing the instruction) to the external agent service 340B (S1003). Moreover, when the control unit 334 generates an instruction to disable the external agent service 340C, the instruction is converted into voice data by the voice synthesizing unit 333, and is then transmitted to the TV agent 310, and subsequently the TV agent 310 instructs the external agent device 320 to disable the external agent service 340C by voice (S1004). During a time period during which the external agent services 340A, 340B, and 340C are disabled by the agent system 330 as described above, the external agent services 340A, 340B, and 340C suppress independent user calling.

It should be noted that besides the case where the agent system 330 disables all of the external agent services 340A, 340B, and 340C all at once, there is also a case where only a part of the external agent services are disabled.

In contrast, when the user ends viewing of the television program, the control unit 334 enables the external agent services 340A, 340B, and 340C. The control unit 334 carries out enabling processing in a format that conforms to calling specifications of each external agent service. Specifically, when the control unit 334 generates an instruction to enable the external agent service 340A, the instruction is converted into voice data by the voice synthesizing unit 333, and is then transmitted to the external agent service 340A (S1002). In addition, the control unit 334 transmits an instruction to enable the external agent service 340B as it is (in other words, without voice-synthesizing the instruction) to the external agent service 340B (S1003). Moreover, when the control unit 334 generates an instruction to enable the external agent service 340C, the instruction is converted into voice data by the voice synthesizing unit 333, and is then transmitted to the TV agent 310, and subsequently the TV agent 310 instructs the external agent device 320 to enable the external agent service 340C by voice (S1004). When the external agent services 340A, 340B, and 340C that have been brought into a disabled state are enabled by the agent system 330 as described above, the external agent services 340A, 340B, and 340C are allowed to restart independent user calling.

It should be noted that besides the case where the agent system 330 enables all of the external agent services 340A, 340B, and 340C all at once, there is also a case where only a part of the external agent services is enabled.

In addition, before performing independent user calling, each of the external agent services 340A, 340B, and 340C is capable of making an inquiry to the agent system 330 about a state of a user, or as to whether or not independent action can be carried out.

In the external agent service 340A, when the processing unit 343A generates an inquiry to the agent system 330, text information is converted into voice data by the voice synthesizing unit 344A, and is then transmitted to the agent system 330 (S1005). While a user is viewing a television program, which means that user calling by the external agent service 340A should be suppressed, when the control unit 334 generates an instruction to disable the external agent service 340A, the instruction is converted into voice data by the voice synthesizing unit 333, and is then transmitted to the external agent service 340A (S1002). Meanwhile, in a case where the user has ended viewing of the television program, which means that user calling by the external agent service 340A is permitted, when the control unit 334 generates an instruction to enable the external agent service 340A, the instruction is converted into voice data by the voice synthesizing unit 333, and is then transmitted to the external agent service 340A (S1002).

In addition, in the external agent service 340B, the processing unit 343B generates an inquiry to the agent system 330, and makes an inquiry to the agent system 330 by API calling (S1006). While the user is viewing a television program, which means that user calling by the external agent service 340B should be suppressed, the control unit 334 transmits an instruction to disable the external agent service 340B to the external agent service 340B as it is (that is to say, without voice-synthesizing the instruction) (S1003). Meanwhile, in a case where the user has ended viewing of the television program, which means that user calling by the external agent service 340B is permitted, the control unit 334 transmits an instruction to enable the external agent service 340B to the external agent service 340B as it is (that is to say, without voice-synthesizing the instruction) (S1003).

In addition, in the external agent service 340C, when the processing unit 343C generates an inquiry to the agent system 330, text information is converted into voice data by the voice synthesizing unit 344C, and is then transmitted to the agent system 330 (S1007). While the user is viewing a television program, which means that user calling by the external agent service 340C should be suppressed, when the control unit 334 generates an instruction to disable the external agent service 340C, the instruction is converted into voice data by the voice synthesizing unit 333, and is then transmitted to the TV agent 310, and the TV agent 310 instructs the external agent device 320 to disable the external agent service 340C by voice (S1004). Meanwhile, in a case where the user has ended viewing of the television program, which means that user calling by the external agent service 340C is permitted, when the control unit 334 generates an instruction to enable the external agent service 340C, the instruction is converted into voice data by the voice synthesizing unit 333, and is then transmitted to the TV agent 310, and the TV agent 310 instructs the external agent device 320 to enable the external agent service 340C by voice (S1004).

Incidentally, an inquiry from each of the external agent services 340A, 340B, and 340C to the agent system 330 can be made in arbitrary timing. However, needless to say, two or more external agent services may be adapted to make an inquiry to the agent system 330 in synchronization.

INDUSTRIAL APPLICABILITY

Up to this point, the technology disclosed in the present description has been described in detail with reference to specific embodiments. However, it is obvious that a person skilled in the art can correct or substitute the foregoing embodiments without departing from the gist of the technology disclosed in the present description.

The present description has been explained focusing on the embodiment in which the technology disclosed in the present description is applied to the TV agent that resides in the television receiver. However, the gist of the technology disclosed in the present description is not limited to this. The technology disclosed in the present description can also be similarly applied to various agent systems each using an agent that resides in various CE apparatuses such as an air conditioner, a recorder, and a washing machine, and resides in various information apparatuses including: an IoT device; a portable information terminal carried by a user, such as a smart phone and a tablet; a wearable apparatus worn by a user; an interactive robot; a car navigation system installed inside a car, and the like. Consequently, an external agent service can be used as necessary.

In short, the technology disclosed in the present description has been described in the form of illustration, and should not be construed as limiting the contents of the present description. In order to determine the gist of the technology disclosed in the present description, the claims should be taken into consideration.

It should be noted that the technology disclosed in the present description can also be configured as follows:

(1) An information processing device including:
    a communication unit that receives information related to an interaction with a user through an agent residing in a first apparatus; and
    a control unit that controls an external agent service.

(1-1) The information processing device set forth in the preceding (1), further including
    a voice recognition unit that recognizes a voice input from the user, a semantic analysis unit that subjects a result of the voice recognition to semantic analysis, and a voice synthesizing unit that voice-synthesizes a response to the user,
    in which a result of the voice synthesis by the voice synthesizing unit is voice-output from the first apparatus.

(2) The information processing device set forth in the preceding (1), in which
    the control unit collects the information that includes at least one among an image or a voice of the user, information related to operation of the first apparatus by the user, and sensor information detected by a sensor with which the first apparatus is equipped.

(3) The information processing device set forth in either of the preceding (1) or (2), in which:
    the first apparatus is a television receiver; and
    the control unit collects the information that includes a viewing history and a recording history of television programs by the user, and a remote control operation history by the user.

(4) The information processing device set forth in either of the preceding (2) or (3), in which
    the control unit manages an account of the user on the basis of the information collected from the first apparatus.

(5) The information processing device set forth in any of the preceding (1) to (4), in which
    the control unit controls calling of the external agent service.

(6) The information processing device set forth in the preceding (5), in which
    the control unit executes calling after performing format conversion so as to cause the calling to conform to calling specifications of each external agent service.

(7) The information processing device set forth in the preceding (6), in which
    the control unit voice-synthesizes contents of calling of the first external agent service, and performs calling of the first external agent service.

(8) The information processing device set forth in the preceding (6), in which
    the control unit voice-synthesizes contents of calling of a second external agent service, and performs voice calling of an external agent device under a control of the second external agent service from the first apparatus.

(9) The information processing device set forth in any of the preceding (5) to (8), further including:

a voice recognition unit that recognizes a voice response from an external agent service; and a semantic analysis unit that subjects a result of the voice recognition to semantic analysis.

(10) The information processing device set forth in any of the preceding (5) to (8), in which
a response is received from an external agent service by API calling.

(11) The information processing device set forth in the preceding (5), in which
the control unit generates a response to an inquiry from the user to the agent by selecting from among, or synthesizing, responses from a plurality of external agent services.

(12) The information processing device set forth in any of the preceding (1) to (11), in which
the control unit controls calling of an external agent service on the basis of profile information of the user who has called the first apparatus.

(13) The information processing device set forth in the preceding (12), in which
the control unit performs calling of an external agent service having a profile switching function on the basis of a result of profile identification of the user who has called the first apparatus.

(14) The information processing device set forth in any of the preceding (1) to (13), in which
the control unit controls calling of an external agent service on the basis of sensitive information of the user who has called the first apparatus.

(15) The information processing device set forth in the preceding (14), in which
the control unit replaces sensitive information included in calling of the user with other information, and then performs the calling of an external agent service.

(16) The information processing device set forth in any of the preceding (1) to (15), in which
the control unit controls an external agent service on the basis of a state of the user.

(16-1) The information processing device set forth in the preceding (16), in which
the control unit controls an external agent service on the basis of a use state of the first apparatus by the user.

(16-2) The information processing device set forth in the preceding (16), in which
the control unit disables and enables an external agent service on the basis of a state of the user.

(16-3) The information processing device set forth in the preceding (16), in which
the control unit responds to an inquiry about calling of an agent from an external agent service on the basis of a state of the user.

(17) An information processing device including:
a communication unit that receives a response to a user, the response having been generated by processing information related to an interaction with the user; and
an output unit that outputs the response.

(18) An information processing method including:
a communication step of receiving information related to an interaction with a user through an agent residing in a first apparatus; and
a control step of controlling an external agent service.

(19) An information processing method including:
a communication step of receiving a response to a user, the response having been generated by processing information related to an interaction with the user; and
an output step of outputting the response.

(20) An information processing system including:
a first apparatus in which an agent that interacts with a user resides;
a communication unit that receives information related to the interaction with the user through the agent; and
a control unit that controls an external agent service.

(20-1) The information processing system set forth in the preceding (20), in which
the first apparatus receives and outputs a response to a user, the response having been generated by processing information related to an interaction with the user.

REFERENCE SIGNS LIST

100 Information apparatus (television receiver)
101 Processing unit
102 Tuner
103 Communication unit
104 Display unit
105 Voice input unit
106 Voice output unit
107 Image capturing unit
108 Sensor unit
109 Remote control receiving unit
110 Recording unit
300 Agent cloud platform
310 TV agent
320 External agent device
321 Voice input unit
322 Voice output unit
330 Agent system
331 Voice recognition unit
332 Semantic analysis unit
333 Voice synthesizing unit
334 Control unit
335 Voice recognition unit
336 Semantic analysis unit

The invention claimed is:
1. An information processing device comprising:
control circuitry configured to:
receive, from a remote device, a voice input from a user;
perform a voice recognition and a semantic analysis of the voice input from the user to create a semantically analyzed voice input;
output:
first information related to the voice input to a first external agent device, and
second information related to the voice input to a second external agent device,
wherein the first information is formed by voice synthesizing the semantically analyzed voice input, and
wherein the second information is the semantically analyzed voice input;
receive:
a first reply to the voice input from the first external agent device,
a second reply to the voice input the second external agent device, and
a third reply to the voice input from a third external agent device that has independently received the voice input from the user,
wherein:
the first reply is a synthesized voice output from the first external agent device,
the second reply is a semantically analyzed reply that is output from the second external agent device, and the third reply is a synthesized voice output from the third external agent device;

aggregate the first, second and third replies into an aggregated reply to the voice input; and output the aggregated reply as a synthesized voice output to the remote device for relay to the user.

2. A method performed by an information processing device that includes a control circuitry, the method comprising:

receiving, from a remote device, a voice input from a user;

performing a voice recognition and a semantic analysis of the voice input from the user to create a semantically analyzed voice input;

outputting:
  first information related to the voice input to a first external agent device, and
  second information related to the voice input to a second external agent device,
  wherein the first information is formed by voice synthesizing the semantically analyzed voice input, and
  wherein the second information is the semantically analyzed voice input;

receiving:
  a first reply to the voice input from the first external agent device,
  a second reply to the voice input the second external agent device, and
  a third reply to the voice input from a third external agent device that has independently received the voice input from the user, wherein:
  the first reply is a synthesized voice output from the first external agent device,
  the second reply is a semantically analyzed reply that is output from the second external agent device, and
  the third reply is a synthesized voice output from the third external agent device;

aggregating the first, second and third replies into an aggregated reply to the voice input; and outputting the aggregated reply as a synthesized voice output to the remote device for relay to the user.

3. A non-transitory computer readable medium containing instructions to cause an information processing device to perform a method, the method comprising:

receiving; from a remote device, a voice input from a user;

performing a voice recognition and a semantic analysis of the voice input from the user to create a semantically analyzed voice input;

outputting:
  first information related to the voice input to a first external agent device, and
  second information related to the voice input to a second external agent device,
  wherein the first information is formed by voice synthesizing the semantically analyzed voice input, and
  wherein the second information is the semantically analyzed voice input;

receiving:
  a first reply to the voice input from the first external agent device,
  a second reply to the voice input the second external agent device, and
  a third reply to the voice input from a third external agent device that has independently received the voice input from the user, wherein:
  the first reply is a synthesized voice output from the first external agent device,
  the second reply is a semantically analyzed reply that is output from the second external agent device, and
  the third reply is a synthesized voice output from the third external agent device;

aggregating the first, second and third replies into an aggregated reply to the voice input; and outputting the aggregated reply as a synthesized voice output to the remote device for relay to the user.

* * * * *